(12) United States Patent
Peng et al.

(10) Patent No.: US 8,312,056 B1
(45) Date of Patent: Nov. 13, 2012

(54) METHOD AND SYSTEM FOR IDENTIFYING A KEY INFLUENCER IN SOCIAL MEDIA UTILIZING TOPIC MODELING AND SOCIAL DIFFUSION ANALYSIS

(75) Inventors: Wei Peng, Fremont, CA (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/231,321

(22) Filed: Sep. 13, 2011

(51) Int. Cl.
*G06F 17/30* (2006.01)
(52) U.S. Cl. ........................................ 707/802; 705/319
(58) Field of Classification Search ................... 707/802; 705/319

See application file for complete search history.

(56) References Cited

U.S. PATENT DOCUMENTS

| | | | |
|---|---|---|---|
| 7,933,843 B1 | 4/2011 | von Groll et al. | |
| 2004/0204982 A1 | 10/2004 | Witting | |
| 2007/0271272 A1 | 11/2007 | McGuire et al. | |
| 2008/0046317 A1 | 2/2008 | Christianson et al. | |
| 2009/0158429 A1 | 6/2009 | Alstyne et al. | |
| 2010/0185519 A1* | 7/2010 | Ramaswamy | 705/14.58 |
| 2010/0241713 A1 | 9/2010 | Shimizu | |
| 2010/0312769 A1* | 12/2010 | Bailey et al. | 707/740 |
| 2011/0055000 A1 | 3/2011 | Zhang et al. | |
| 2011/0093532 A1 | 4/2011 | Wormington et al. | |
| 2011/0106890 A1* | 5/2011 | Karpov et al. | 709/206 |
| 2011/0137989 A1* | 6/2011 | Kiciman et al. | 709/204 |
| 2011/0191406 A1* | 8/2011 | Plunkett et al. | 709/203 |
| 2011/0231296 A1* | 9/2011 | Gross et al. | 705/37 |
| 2011/0246457 A1* | 10/2011 | Dong et al. | 707/725 |
| 2012/0041953 A1* | 2/2012 | Dumais et al. | 707/739 |
| 2012/0066212 A1* | 3/2012 | Jennings | 707/723 |

OTHER PUBLICATIONS

Haewoon Kwak, Changhyun Lee, Hosung Park, and Sue Moon, "What is Twitter, a Social Network or a News Media?", ACM, WWW 2010, Apr. 26-30, 2010, pp. 591-600.*
Jagan Sankaranarayanan, Hanan Samet, Benjamin E. Teitler, Michael D. Lieberman, and Jon Sperling, "TwitterStand: News in Tweets", ACM GIS '09, Nov. 4-6, 2009, pp. 42-51.*
Jeff Huang, Katherine M. Thornton and Efthimis N. Efthimiadis, "Conversational Tagging in Twitter", ACM, Ht'10, Jun. 13-16, 2010, pp. 173-177.*
Bakshy, E. et al., "Identifying 'Influencers' on Twitter," *WSDM* (2011) Hong Kong.
Barthélemy: M., "Betweenness Centrality in Large Complex Networks," *Eur Phys. Jour. B.* (2004) 38(2):163-168.
Borthakur, D., *The Hadoop Distributed File System: Architecture and Design* (2007) The Apache Software Foundation, 14 pages.

(Continued)

*Primary Examiner* — Cheryl Lewis
(74) *Attorney, Agent, or Firm* — Kermit D. Lopez; Luis M. Ortiz; Ortiz & Lopez, PLLC

(57) ABSTRACT

A system and method for identifying a key influencer in a social media environment for enterprise marketing utilizing topic modeling and social diffusion analysis. A user interest profile can be generated by analyzing historical data stored in a database utilizing. A social graph can be generated and an influence measuring process based on the social graph data can be performed utilizing a static diffusion model and a dynamic diffusion model to calculate a set of key influencers. The dynamic diffusion model considers time stamp information to assess an impact of each user communication on the growth of a conversation within a time period. The key influencer can be identified in a specific topic area and a number of total users that can be reached via the influencer within a specific time window can be predicted.

20 Claims, 6 Drawing Sheets

OTHER PUBLICATIONS

Brin, S. et al., "The Anatomy of a Large-Scale Hypertextual Web Search Engine," *Computer Networks and ISDN Systems* (1998) 30:107-117.

Chea, E. et al., "How accurate and statistically robust are catalytic site predictions based on closeness centrality?," *BMC Bioinformatics* (2007) 8:153.

Java, A. et al., "Why We Twitter: Understanding Microblogging Usage and Communities," *Joint 9th WEBKDD and 1st SNA-KDD Workshop '07* Aug. 12, 2007 San Jose, CA.

Kleinberg, J. M., "Authoritative Sources in a Hyperlinked Environment," *Journal of the ACM* (1999) 46(5):604-632.

Miorandi, D. et al., "K-Shell Decomposition for Dynamic Complex Networks," *WiOpt'10 Modeling and Optimization in Mobile, AdHoc, and Wireless Networks* (2010) pp. 499-507.

Pang, B. et al., "Opinion Mining and Sentiment Analysis," *Foundations and Trends in Information Retrieval* (2008) 2(1-2):1-135.

Welch. M. J. et al., "Topical Semantics of Twitter Links" *WSDM'11* Feb. 9-12, 2011 Hong Kong, China, 10 pages.

Weng, J. et al., "TwitterRank: Finding Topic-sensitive Influential Twitterers." *WSDM'10* Feb. 4-6, 2010 New York City, New York, pp. 261-270.

Diestel, R., Graph theory, vol. 173 of graduate texts in mathematics, Springer, Heidelberg, 91:92, 2005.

Kwak, H. et al., "What is Twitter, a Social Network or a News Media?" *International World Wide Web Conference* Apr. 26-30, 2010 Raleigh, North Carolina, 10 pages.

Parzen, E., Stochastic processes, vol. 24, Society for Industrial Mathematics, 1999.

Shiels, M., "Twitter co-founder Jack Dorsey rejoins company," *BBC News Business* Mar. 28, 2011 2 pages, http://www.bbc.co.uk/news/business-12889048.

Yao, D. D., "First-Passage-Time Moments of Markov Processes," *J. Appl. Prob.* (1985) 22:939-945.

* cited by examiner

METHOD AND SYSTEM FOR IDENTIFYING A KEY INFLUENCER IN SOCIAL MEDIA UTILIZING TOPIC MODELING AND SOCIAL DIFFUSION ANALYSIS

TECHNICAL FIELD

Embodiments are generally related to marketing management systems and methods. Embodiments are also related to social network-based marketing approaches. Embodiments are additionally related to topic modeling and social diffusion analysis. Embodiments are further related to the identification of a key influencer in a social media environment in the context of an enterprise marketing service.

BACKGROUND OF THE INVENTION

Social media generally involves large number of users that interact socially with one another and in which such users can freely express and share opinions with other users via a social networking application. Social media encompasses online media such as, for example, collaborative projects (e.g. Wikipedia), blogs and microblogs (e.g. Twitter), content communities (e.g. YouTube), social networking sites (e.g. Facebook), virtual game worlds (e.g. World of Warcraft), and virtual social worlds (e.g. Second Life). Online social media can be harvested to generate data regarding products, services, brands, competition, and industries and to actively influence a purchase decision. In the marketing domain, a buyer having a greater impact on other buyers may be treated as a powerful promoter and/or an influential user, and their opinions may thus determine the marketing acceptance of a certain product.

Enterprise Marketing Services (EMS) delivers personalized content to a broad customer base in accordance with particular user profile information with the immediate goal of improving the response rate. Such services, however, do not take advantage of social network data to effectively target the influential user in a social network context and to leverage substantial social influence regarding product purchasing. Social media marketing, which employs social network data to benefit the enterprise and an individual with additional marketing channel, has recently gained more traction. In order to optimize the coverage of the marketing messages for the enterprise, it is essential to select a set of influential users in the social network (i.e., powerful promoters). Such influential users do not necessarily have the most followers, but possess the ability to influence other people's decision making in the purchase process.

The majority of academic research and commercial social media listening tools (e.g. Radian6, Sysomos, Klout) provide algorithms that score and rank a user's influences in a social network. Such influence scoring methods generate a single score value with little topical insights and topical context information. The influence scores are usually computed based on a network structure metric (e.g., number of followers or page rank) or an activity-centric metric in the social network (e.g., frequency of posts, responses, number of likes or comments within user's direct connections, etc.). Such approaches do not take into account a temporal diffusion model in any topical context.

Furthermore, the usage of social media listening tools to benefit an enterprise and individuals with additional marketing channel ignores user interests. For example, prior art approaches to date are only capable of targeting general influential users without any topical context for a specific product marketing campaign. Ignoring user interests and topics, however, can seriously affect the likelihood of the message adoption by the targeted users. Unfortunately, it is difficult to relate the importance of scores to the marketing metrics (e.g. response rate, coverage or reach, the number of positive feedbacks, and etc.) and the temporal diffusion information is not considered into the static social graph computing.

Based on forgoing, it is believed that a need exists for an improved system and method identifying a key influencer in a social media for an enterprise marketing service utilizing a topic modeling and a social diffusion analysis. A need also exists for an improved method for predicting a marketing campaign message propagation speed and coverage in the social network, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved social network-based marketing management system and method.

It is another aspect of the disclosed embodiments to provide for an improved system and method for identifying a key influencer in a social media for an enterprise marketing service utilizing a topic modeling and a social diffusion analysis.

It is a further aspect of the disclosed embodiments to provide for an improved method for predicting a marketing campaign message propagation speed and coverage in the social network.

The aforementioned aspects and other objectives and advantages can now be achieved as described herein. A system and method for identifying a key influencer in a social media environment for an enterprise marketing service utilizing a topic modeling and a social diffusion analysis is disclosed herein. A user interest profile can be generated by analyzing a historical message stored in a database utilizing a topic modeling approach (e.g., Latent Dirichlet Allocation). A social graph containing social data can be generated and an influence measuring process based on the social graph data can be performed utilizing a static diffusion model (e.g., betweenness centrality analysis, K-Shell decomposition process) and/or a dynamic diffusion model (e.g., diffusion graph construction, continuous-time Markov process) to calculate a set of key influencers. The dynamic diffusion model considers time stamp information to assess an impact of each user communication on the growth of a conversation within a predefined time period. The key influencer can be accurately identified in the specific topic area and a number of total users that can be reached via the influencer within the specific time window can be predicted by the dynamic diffusion model and an open-source data intensive distributed application module.

The topic modeling approach (e.g., Latent Dirichlet Allocation) extract topics from a raw text and a group of social contents posted by the user or a hashtag together so that each user or each hashtag can be related to a set of messages. A spammer filtering and text preprocessing can be performed before modeling the user interest topics. A social graph can be generated utilizing the user as a node and various social relationships between users as edges. The edge weight can be defined based on the strength of relationship, for example, frequency, number, and intimacy of a social interaction. The static diffusion model includes a graph metric analysis, for example, a betweenness centrality analysis and K-Shell decomposition. The betweenness centrality measures centrality of a node within a graph in order to emphasize strength of a weak tie between at least two clustered communities that possess an impact on coverage of the marketing message diffusion process. The K-Shell decomposition is a network pruned down to the nodes with more than neighbors and an individual in the highest k-shells are considered as the most influential spreaders.

The dynamic diffusion model includes a diffusion graph construction and a continuous-time Markov process. The diffusion graph construction generates a propagation sequence based on the hashtags (seen as a topic) and a uniform resource locator (URL). A group of users can be sequenced based on the time of post for a given hashtag/URL. The sequences can be categorized into various topics utilizing the topic modeling approach. The sequences in each topic can construct a topic-dependent diffusion graph. The influential users calculation based on different diffusion graph naturally considers the topic-dependent user interest/expertise.

The continuous-time Markov process can also be employed to analyze the diffusion process. A transition probability from one state to another state over a time period can be denoted. A message (which are about the trends/topics, URLs) propagation state can be extracted using the time stamp information. A user rank and a transition rate matrix based on the extracted states can be computed. A transition matrix and a steady state distribution of the transition matrix can be generated. A mean first passage matrix can be calculated and a mean first passage time matrix can be computed. The rank of the user can be computed and the propagation estimation can be performed. The influence computation process can be accelerated utilizing the open-source data intensive distributed application module (e.g., hadoop) to calculate the key influencer within the specific time window. Such an approach permits more efficient targeting of the marketing message to the social media user having greatest influence on a targeted community.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
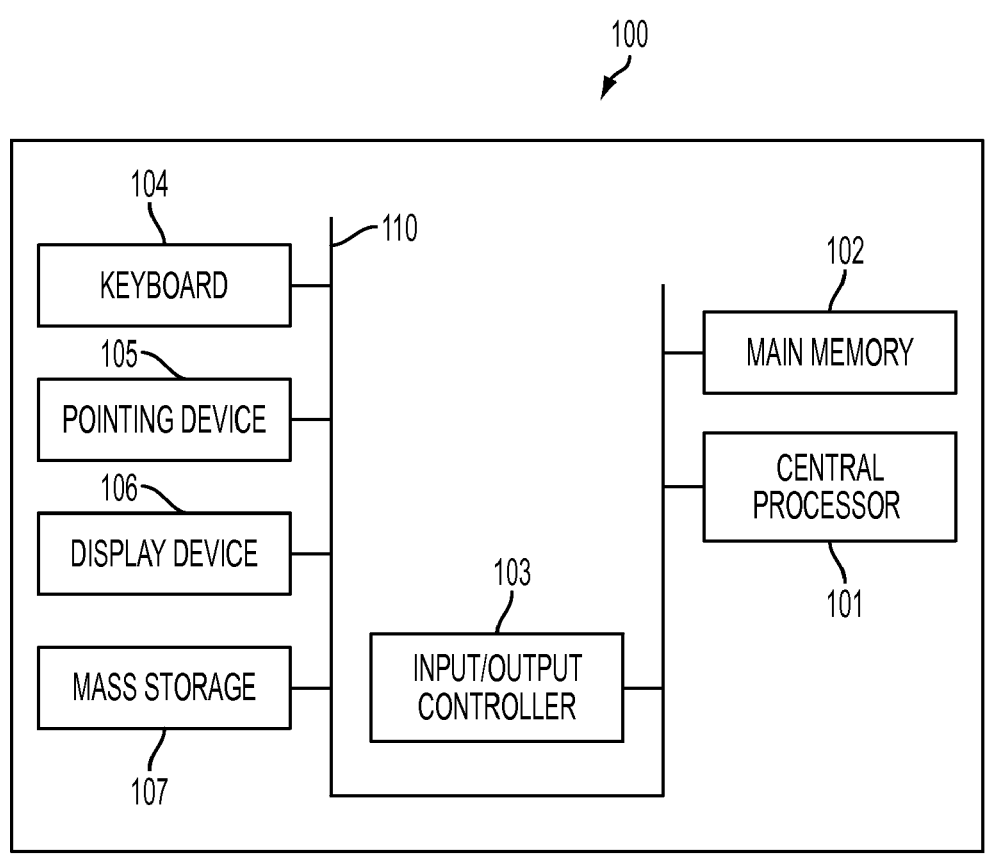
FIG. 1 illustrates a schematic view of a computer system, in accordance with the disclosed embodiments.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Although not required, the disclosed embodiments will be described in the general context of computer-executable instructions such as program modules being executed by a single computer. In most instances, a "module" constitutes a software application. Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

Figure 2:
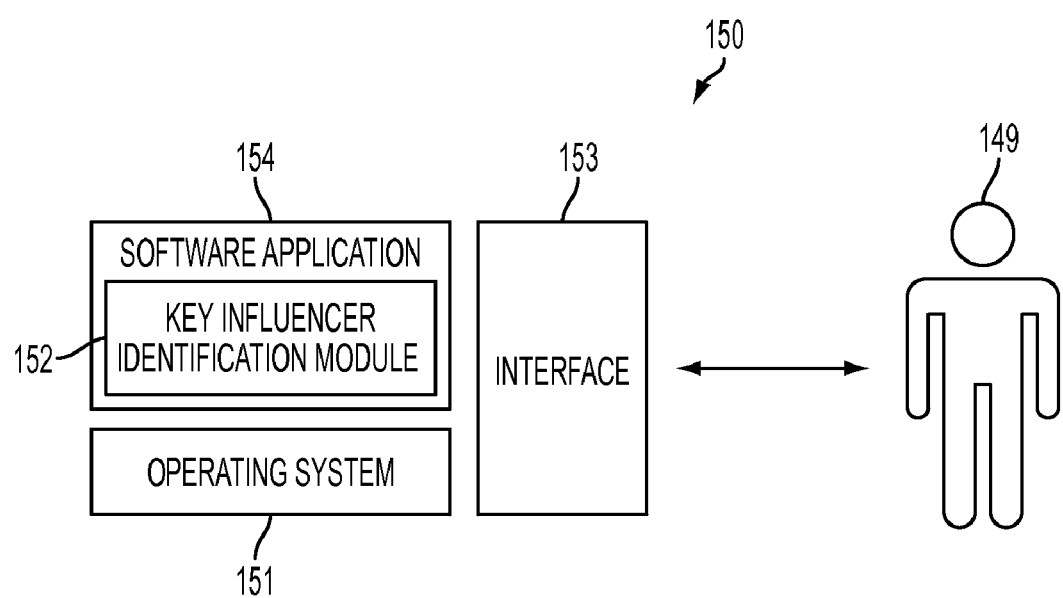
FIG. 2 illustrates a schematic view of a software system including a key influencer identification module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), etc., and a peripheral connection such as, for example, a USB (Universal Serial Bus) connection. As illustrated, the various components of data-processing system 100 can communicate electronically through a system bus 110 (e.g., a data bus) or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 152 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a key influencer identification module 152 for identifying a key influencer and predicting a message propagation speed and coverage of a marketing message in the social media network for an enterprise marketing service. Software application 154, on the other hand, can include instructions such as the various operations described herein with respect to the various components and modules described herein such as, for example, the method 500 depicted in FIG. 6.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
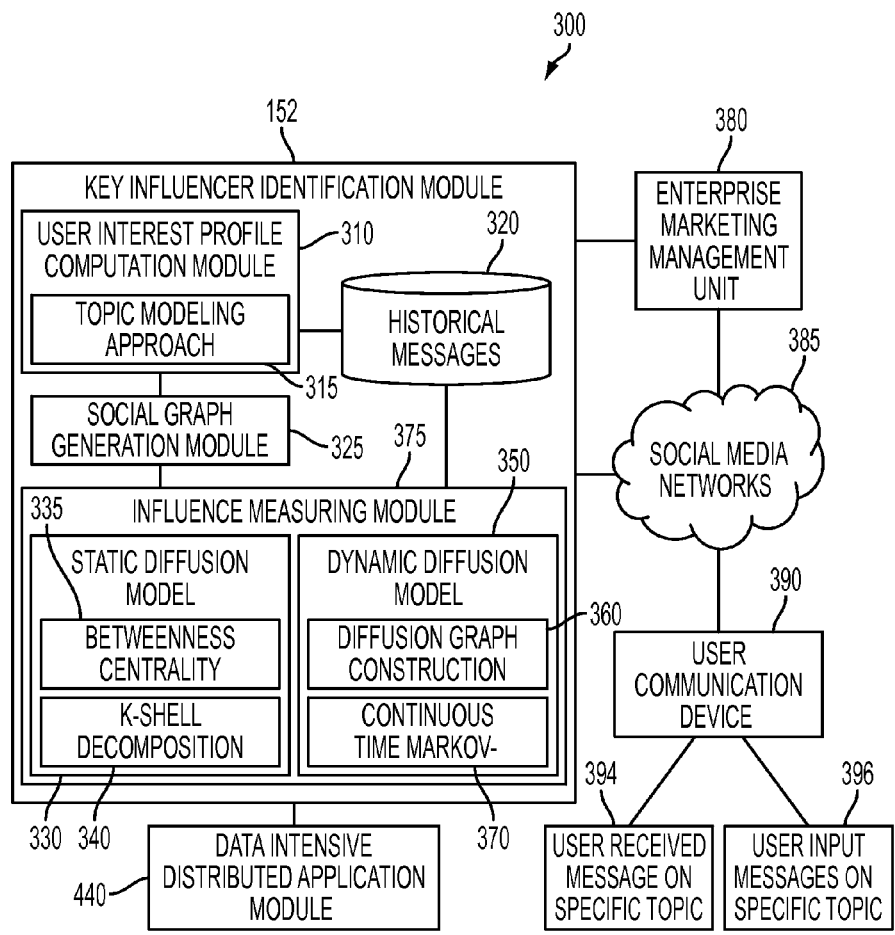
FIG. 3 illustrates a block diagram of an enterprise marketing management system associated with a social media network to identify a key influencer and to predict a message propagation speed and coverage, in accordance with the disclosed embodiments.
Figure 4:
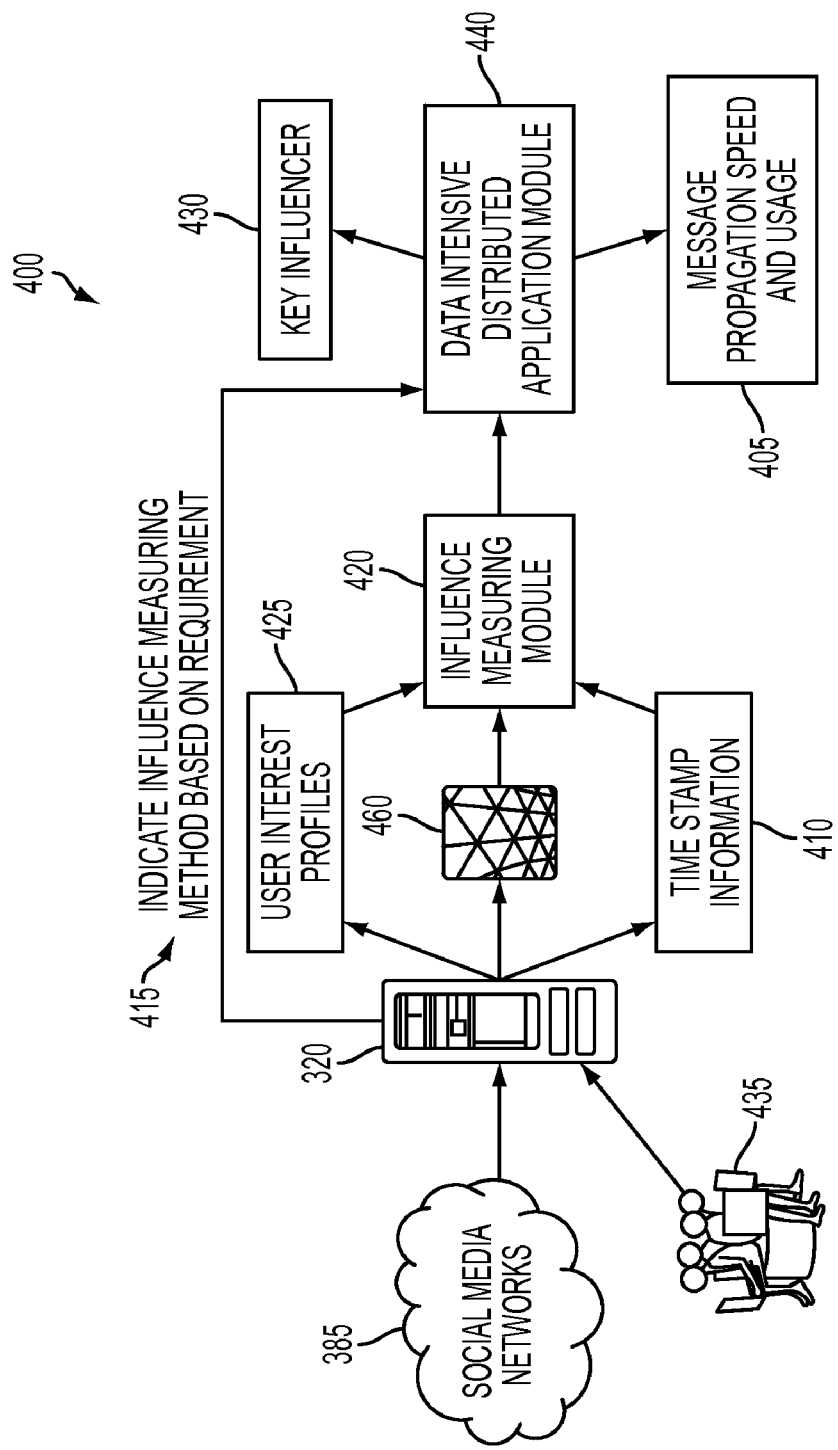
FIG. 4 illustrates a flow diagram for identifying the key influencer and predicting the message propagation speed and coverage in the social media network for the enterprise marketing service, in accordance with the disclosed embodiments.

FIG. 3 illustrates a block diagram of an enterprise marketing management system 300 associated with a social media network 385 to identify a key influencer, in accordance with the disclosed embodiments. Note that in FIGS. 1-6 identical parts or elements are generally indicated by identical reference numerals. The social media networks 385 can be configured to a key influencer identification module 152 to identify a key influencer 430 as shown in FIG. 4 in a social media environment for an enterprise marketing management unit 380 utilizing a topic modeling and a social diffusion analysis. The social media networks 385 can be any social media including, but not limited to, networks, websites, or computer enabled systems. For example, a social media network may be MySpace, Facebook, Twitter, Linked-In, Spoke, or other similar computer enabled systems or websites. A user communication device 390 can communicate with the social media networks 385. Note that the user communication device 390 can be, for example, a mobile communication device, the data-processing system 100 or a web-enabled device, depending upon design considerations.

The social media networks 385 can communicate with the enterprise marketing management unit 380, which in turn can communicate with the user communication device 390. In general, enterprise marketing management defines a category of software employed by marketing operations to manage their end-to-end internal processes. Enterprise marketing management is a subset of marketing technologies which consists of a total of three key technology types that allow for corporations and customers to participate in a holistic and real-time marketing campaign. Enterprise marketing management consists of other marketing software categories such as web analytics, campaign management, digital asset management, web content management, marketing resource management, marketing dashboards, lead management, event-driven marketing, predictive modeling, and more. The enterprise marketing management unit 380 exchanges data between users in the social media networks 385. The user communication device 390 permits the user of the social media networks 385 to transmit a message on a specific topic 396 and to receive a message on a specific topic 394.

The key influencer identification module 152 includes a user interest profile computation module 310, a social graph generation module 325, and an influence measuring unit 375. The key influencer identification module 152 generates a user interest profile 425, shown in FIG. 4, by analyzing a historical message stored in a database 320 utilizing a topic modeling approach 315. The social graph generation module 325 generates a social graph using the users as nodes and various social relationships among users as edges. The influence measuring unit 375 calculates the key influencer 430 based on the social graph data 460 utilizing a static diffusion model 330 and a dynamic diffusion model 350. The static diffusion model 330 calculates the set of key influencer 430 based on a graph metric analysis such as, for example, betweenness centrality 335 and a K-shell decomposition process 340.

The dynamic diffusion model 350 calculates the set of key influencers 430 based on diffusion graph construction 360 or a continuous-time Markov process 370. The dynamic diffusion model 350 considers time stamp information 410 to assess an impact of each user communication on the growth of a conversation within a given unit of time. The key influencer 430 can be accurately identified in the specific topic area and a number of total users that can be reached via the influencer 430 within a specific time window can be predicted by the dynamic diffusion model and an open-source data intensive distributed application module 440. The data intensive distributed application module 440 can be, for example, an Apache Hadoop which is a software framework that supports data-intensive distributed applications under a free license. It enables applications to work with thousands of nodes and petabytes of data. Note that the "influencers" can be, for example, product experts, advocates, brand evangelists, and opinion leaders. The product advocates on the social network 385 spread positive word with respect to a product or service as opinion leaders for a marketing purpose.

FIG. 4 illustrates a flow diagram 400 for identifying the key influencer 430 and predicting the message propagation of a marketing message 405 in the social media network 385 for the enterprise marketing service 380, in accordance with the disclosed embodiments. The user information can be retrieved from the social media networks 385 and the user interest profile 425 can be generated by analyzing the historical message stored in the database 320 utilizing the topic modeling approach 315. The user information can include, but is not limited to, historical posts, historical tweets, or other historical communications that a user may have received or sent. The influence measuring module 375 can be indicated based on the requirement and a marketing context can be specified, as illustrated by arrows 415 and 435.

Figure 5:
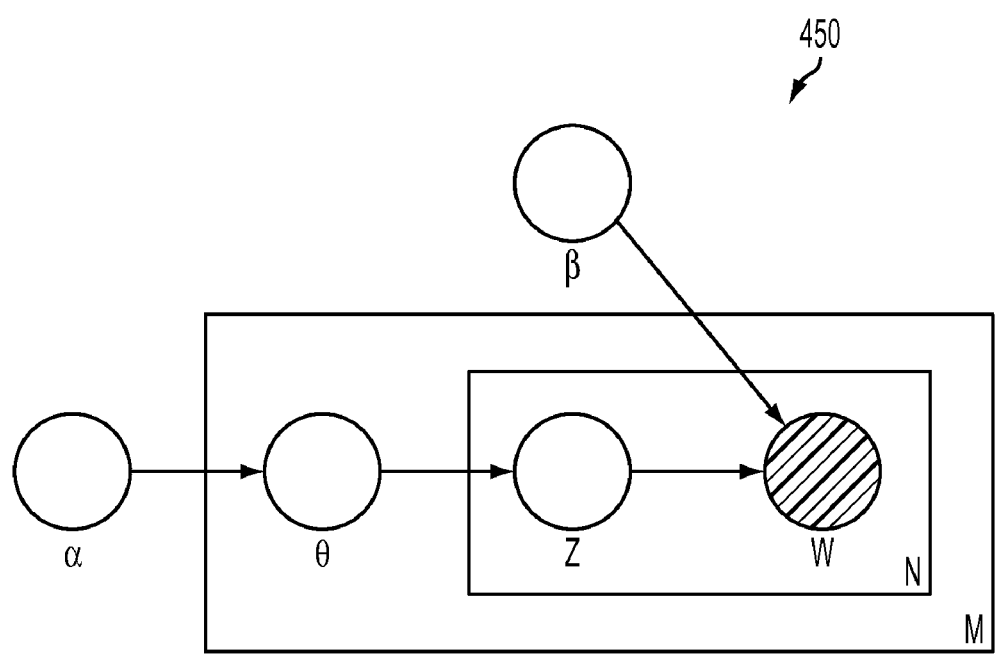
FIG. 5 illustrates a graphical representation of Latent Dirichlet Allocation (LDA) process, in accordance with the disclosed embodiments.

The topic modeling approach 315 extracts topics from a raw text and/or a group of social contents posted by an individual user or a particular hashtag so that each user or each hashtag can be related to a set of messages. A spammer filtering and text preprocessing approach can be performed before modeling the user interest topics. The topic modeling approach 315 can be, for example, Latent Dirichlet Allocation (LDA) modeling which results in mixtures of topics within a document. In general, the latent Dirichlet Allocation is a generative model that permits sets of observations to be explained by unobserved groups that explain why some parts of the data are similar. For example, if observations are words collected into documents, it posts that each document is a mixture of a small number of topics and that each word's creation is attributable to one of the document's topics. The typical representation of the LDA model is illustrated in FIG. 5 where w represents the word, z represents the topic for the document, $\theta$ represents the topic distribution for the document, and $\alpha$, $\beta$ represents hyperparameters. The social media metadata such as the number of friends and contained hashtags can also assist in extending the LDA to refine the results.

The social graph 460 can be generated using the users as nodes and various social relationships among users as edges.

The edge weight can be defined based on the strength of relationship, for example, frequency, number, and the intimacy of social interactions (e.g., follow, likes, mention, retweet, and reply, etc.). The influence measuring unit 375 calculates the set of key influencer 430 utilizing the static diffusion model 330 and the dynamic diffusion model 350. The static diffusion model 330 includes the betweenness centrality analysis 335 that measures centrality of a node within a graph. In general, vertices that occur on many shortest paths between other nodes have higher betweenness than the others. Betweenness centrality 335 is a measure of a node's centrality in a network. In other words, the number of shortest, paths from all vertices to all others that pass through that node. Betweenness centrality 335 is a more useful measure of the load placed on the given node in the network as well as the node's importance to the network than just connectivity. The latter is only a local effect while the former is more global to the network. The betweenness can be defined as illustrated below in equation (1):

$$C_B(v) = \sum_{s \neq v \neq t \in V} \frac{\sigma_{st}(v)}{\sigma_{st}} \qquad (1)$$

wherein s, v, and t denotes three nodes in the graph, $\sigma_{st}$ represents the number of shortest paths from s to t, and $\sigma_{st}(v)$ represents the number of shortest paths from s to t that pass through v. The metric often emphasizes the strength of "weak tie" between two clustered communities, which possess significant impact on the coverage or reach of the marketing message diffusion process. The betweenness centrality analysis 335 also expedited the marketing campaign message propagation speed and coverage in the social network 385.

The K-Shell decomposition 340 is a network pruned down to the nodes with more neighbors decomposition and can be employed for analyzing the structure of large scale graphs. Individuals in the highest K-shells can be considered as the most influential spreaders. K-Shell emphasizes the "importance" of nodes based on their positions within the large-scale network structure. The K-Shell decomposition 340 eliminates the problems of selecting very close users on the network with redundant influence that are often seen in page rank.

The dynamic diffusion model 350 includes the diffusion graph construction 360 that generates propagation sequences based on the hashtags (seen as a topic) and a uniform resource locator (URL). A group of users can be sequenced based on the time of post for a given hashtag/URL. The propagation sequences based on the hashtags (seen as a topic) and URLs can be generated in order to understand the propagation of message/topic on social network over the time. Both hashtags and URLs are unique in their representations and using them can avoid very sparse propagation matrix. A group of users can be sequenced based on the time when they post the hashtag/URL for the given hashtag/URL. For example, consider hashtag/URL i has the sequence composed of $X_i(t_1)$, $X_i(t_2)$, ... $X_i(t_m)$, where $X_i(t_1)$ is the user posting hashtag/URL i at time $t_j$. The sequences can be categorized into various topics using the topic modeling approach 315. The sequences in each topic can construct a topic-dependent diffusion graph. The influential users calculation based on different diffusion graph naturally considers the topic-dependent user interest/expertise.

The continuous-time Markov process 370 can be employed to analyze the diffusion process. The transition probability from one state to another state over a time period can be denoted. The messages (which are about the trends/topics, URLs) propagation states can be extracted using the time stamp information 410. After obtaining the diffusion graph, the continuous-time Markov process 370 can be employed to analyze the diffusion process. The Markov property states that at any times s>t>0, the conditional probability distribution of the process at time s given the whole history of the process up to and including time t depends only on the state of the process at time t. In effect, the state of the process at time s is conditionally independent of the history of the process before time t, given the state of the process at time t.

The continuous-time Markov process 370 is a continuous time stochastic process $\{X(t), t \geq 0\}$ s.t. $\forall s, t \geq 0$, and $\forall i, j$, x(h). The conditional probability distribution of the process at time t+s for all the previous states depends only on the state of the process at time t and can be defined by the following equation (2):

$$P\{X(t+s) = \qquad (2)$$
$$j|X(t) = i, X(h) = x(h), 0 \leq h \leq t\} = P\{X(t+s) = j|X(t) = i\}$$

The users in the social network 385 can be denoted by nodes once a message is really propagated from one user to the other, an edge is constructed between them. The messages obtained from the social network 385 at a specific time stamp represents a single state and a set of states can be garnered from the social network 385 over a time period. The algorithm described below can be applied in order to adopt continuous-time Markov process 370 on these states and finally extract the most powerful influencers 430. The transition probability from the state i to the state j over s time period can be denoted by $P_{ij}(s)$, the transition rate from i to j per time unit can be written as shown in equation (3):

$$q_{ij} = \lim_{\Delta t \to 0} \frac{P\{X_{t+\Delta t} = j | X_t = i\}}{\Delta t} = \lim_{\Delta t \to 0} \frac{P_{ij}(\Delta t)}{\Delta t} \quad (i \neq j) \qquad (3)$$

The total transition rate out of state i is generally given by the following equation (4):

$$q_i = \sum_{j \neq i} q_{i,j} \qquad (4)$$

The messages (which are about the trends/topics, URLs) propagation states 405 can be extracted using time stamp information 410. The "states" from the social network data over all the time stamps can be identified for a given a trend/topic or URL (T). A typical "state" identification process based on a specific time stamp can be performed. The users involved in spreading T as the nodes in the social graph can be marked, then if T really propagates from one user to another one, an edge is constructed between them, finally return the generated social graph as the "state" for the time stamp. The user rank can then be computed as follows. The transition rate matrix Q based on the extracted states can be computed and a transition matrix Pv can be calculated, as shown in equation (5):

$$P_v = I + \frac{1}{v}Q \quad (5)$$

wherein v is the constant, which satisfies: $v \geq \max_i(q_i)$. The steady state distribution of Pv can be generated and the mean first passage matrix My can be calculated, as shown in equation (6):

$$M_v = (I - Z_v + E(Z_v)_{dg})D \quad (6)$$

The mean first passage time matrix M can then be computed as follows:

$$M = \frac{1}{v}(M_v)_{of} + \Lambda(M_v)_{dg} \quad (7)$$

wherein $$\Lambda = \text{diag}(q_i^{-1}) \quad (8)$$

The rank of the user u can be computed as shown in equation (9):

$$1 \bigg/ \left( \frac{1}{|N-1|} \Sigma_{u' \neq u} m_{u'u} \right) \quad (9)$$

The propagation estimation can be performed by initially diagonalizing the matrix, as indicated in equation (10) as follows:

$$Q = MDM^{-1} \quad (10)$$

The transition probability matrix P(t) can be estimated with a,bth entry $P_{ab}(t)$ using the following equation:

$$P(t) = \lim_{m \to \infty} \left( I + Q\frac{t}{m} \right)^m \quad (11)$$

wherein I is the identity matrix, and t denotes the specific time stamp. The matrix L(t) can be estimated with a,bth entry L(a, b, t) which represents the transition probability from user a to user b at time t. Hence, with the assistance of L(t), a set of seed users U, all the users N, and the specific time stamp t, a probability threshold r, the users within the set N\U that have the transition probability greater than T can be obtained. This set of users can be treated as the "spread" of the seed users U. The reliable and scalable open-source distributed application module 440 can be employed to calculate the importance/influence of users for a user within a specific time window to speed up the influence computation process.

Figure 6:
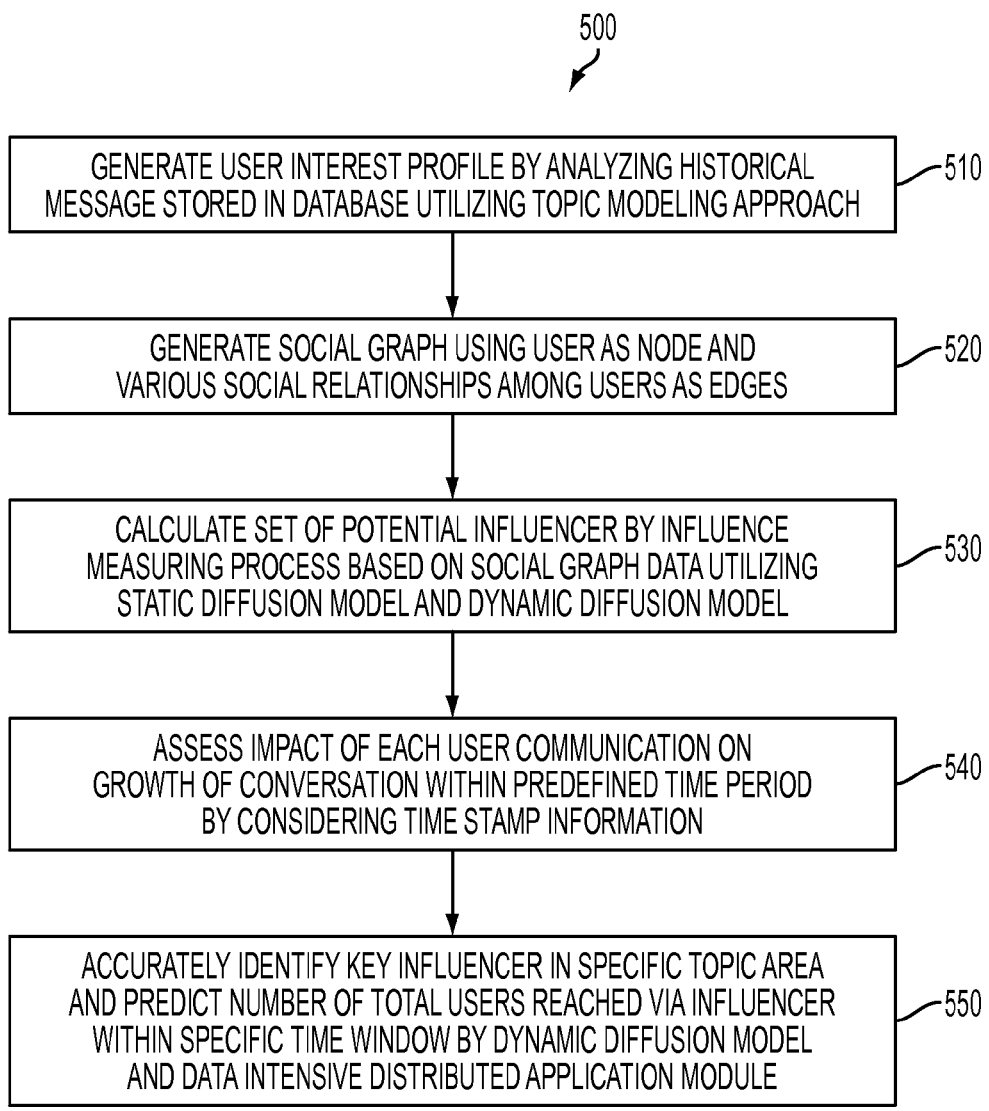
FIG. 6 illustrates a high level flow chart of operations illustrating logical operational steps of a method for identifying the key influencer and predicting the message propagation speed and coverage in the social media network for the enterprise marketing service, in accordance with the disclosed embodiments.

FIG. 6 illustrates a high level flow chart of operations illustrating logical operational steps of a method 500 for identifying the key influencer and predicting the message propagation speed and coverage of the marketing message in the social media network for the enterprise marketing service, in accordance with the disclosed embodiments. Note that the method 500 can be implemented in the context of a computer-useable medium that contains a program product including, for example, a module or group of modules. Initially, the user interest profile 425 can be generated by analyzing the historical message stored in the database 320 utilizing a topic modeling approach 315, as indicated at block 510.

The social graph 460 can be generated, as shown at block 520. Next, the influence measuring process based on the social graph data 460 can be performed utilizing the static diffusion model 330 (e.g., graph metric analysis) and the dynamic diffusion model 350 (e.g., diffusion graph construction, continuous-time Markov process) to calculate the set of key influencers 430, as indicated at block 530. Thereafter, as illustrated at block 540, an impact of each user communication on the growth of a conversation within a given unit of time can be assessed by considering the time stamp information 410. Finally, the key influencer 430 can be accurately identified in the specific topic area and a number of total users that can be reached via the influencer within a specific time window 410 can be predicted by the dynamic diffusion model 350 and the open-source data intensive distributed application module 440, as indicated at block 550.

Based on the foregoing, it can be appreciated that a number of different embodiments can be implemented, as disclosed herein. For example, in one embodiment, a method can be provided for identifying a key influencer in social media. Such a method can include the steps of, for example, compiling a user interest profile by analyzing a historical message stored in a database utilizing a topic modeling approach to thereafter generate social graph data, and performing an influence measuring process based on the social graph data utilizing an influence measuring module and a data intensive distributed application module to identify a set of key influencers in a particular topic area by considering time stamp information. Such a method can further include the step of assessing an impact of user communication with respect to growth of a conversation within a predefined time interval in order to predict a message propagation speed and coverage in a social network and permit efficient targeting of the message to the key influencer of a targeted community.

In another embodiment, the aforementioned topic modeling approach can comprise a Latent Dirichlet Allocation modeling process. In yet another embodiment, such a topic modeling approach can further include steps such as extracting a topic from a raw text and a plurality of social contents posted by the user and/or a hashtag so that the user and the hashtag is related to a set of messages, and performing a spammer filtering and text preprocessing approach before modeling the user interest topic. In still another embodiment, a step can be implemented for generating the social graph utilizing the user as a node and a social relationship between the users as an edge wherein the edge weight is defined based on a strength of relationship.

In another embodiment, the aforementioned influence measuring process can include a static diffusion model. In still another embodiment, the aforementioned static diffusion model can comprise one or more of the following types of model: a betweenness centrality analysis and a K-Shell decomposition process. In yet another embodiment, the aforementioned betweenness centrality analysis can further comprise measuring the centrality of a node within a graph by the betweenness centrality analysis in order to emphasize strength of a weak tie between at least two clustered communities having an impact on coverage of a marketing message diffusion process. In another embodiment, the aforementioned K-Shell decomposition process can further comprise considering an individual in a highest K-shell as the influential user.

In another embodiment, the aforementioned influence measuring process can comprise a dynamic diffusion model. In another embodiment, the dynamic diffusion model can comprise of one or more of the following types of model: a diffusion graph construction process and a continuous-time Markov process. In still another embodiment, the diffusion graph construction process can further comprise steps such as, for example, generating a propagation sequence based on a hashtag and a uniform resource locator and sequencing a group of users based on a time of post for a given hashtag and uniform resource locator, and categorizing the propagation sequence into a plurality of topics utilizing the topic modeling approach wherein the propagation sequence in each topic constructs a topic-dependent diffusion graph that naturally considers a topic-dependent user interest.

In another embodiment, the aforementioned continuous-time Markov process can further include steps such as, for example, denoting a transition probability from one state to another state over a time period and extracting a message propagation state utilizing the time stamp information; computing a user rank by calculating a transition rate matrix based on an extracted state in order to thereafter generate a transition matrix and a steady state distribution of the transition matrix; estimating a mean first passage matrix and a mean first passage time matrix in order to calculate the user rank; and performing a propagation estimation by estimating a transition probability matrix to identify the key influencer. In another embodiment, a step can be provided for accelerating the influence measuring process utilizing the data intensive distributed application module to calculate the key influencer within the specific time window.

In still another embodiment, a system can be provided for identifying a key influencer in a social media. Such a system can include, for example, a processor and a computer-usable medium embodying computer code. The computer-usable medium can be coupled to the data bus. The computer program code can include instructions executable by the processor and configured for compiling a user interest profile by analyzing a historical message stored in a database utilizing a topic modeling approach to thereafter generate social graph data; performing an influence measuring process based on the social graph data utilizing an influence measuring module and a data intensive distributed application module to identify a set of key influencers in a particular topic area by considering time stamp information; and assessing an impact of user communication with respect to growth of a conversation within a predefined time interval in order to predict a message propagation speed and coverage in a social network and permit efficient targeting of the message to the key influencer of a targeted community.

In another embodiment, the aforementioned topic modeling approach can comprise a Latent Dirichlet Allocation modeling process. In yet another embodiment, the aforementioned instructions can be further configured for generating the social graph utilizing the user as a node and a social relationship between the users as an edge wherein the edge weight is defined based on a strength of relationship. In still another embodiment, the influence measuring process can comprise a static diffusion model. In another embodiment, the influence measuring process can comprise a dynamic diffusion model. In still another embodiment, the aforementioned instructions can be further configured for accelerating influence measuring process utilizing the data intensive distributed application module to calculate the key influencer within the specific time window.

In another embodiment, a processor-readable medium storing code representing instructions to cause a processor to perform a process for identifying a key influencer in a social media can be provided. Such code can comprise code to, for example, compile a user interest profile by analyzing a historical message stored in a database utilizing a topic modeling approach to thereafter generate social graph data; perform an influence measuring process based on the social graph data utilizing an influence measuring module and a data intensive distributed application module to identify a set of key influencers in a particular topic area by considering time stamp information; and assess an impact of user communication with respect to growth of a conversation within a predefined time interval in order to predict a message propagation speed and coverage in a social network and permit efficient targeting of the message to the key influencer of a targeted community.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for identifying a key influencer in a social media, said method comprising:
   compiling a user interest profile by analyzing a historical message stored in a database utilizing a topic modeling approach to thereafter generate social graph data;
   performing an influence measuring process based on said social graph data utilizing an influence measuring module and a data intensive distributed application module to identify a set of key influencers in a particular topic area by considering time stamp information; and
   assessing an impact of user communication with respect to growth of a conversation within a predefined time interval in order to predict a message propagation speed and coverage in a social network and permit efficient targeting of said message to said key influencer of a targeted community.

2. The method of claim 1 wherein said topic modeling approach comprises a Latent Dirichlet Allocation modeling process.

3. The method of claim 2 wherein said topic modeling approach further comprises:
   extracting a topic from a raw text and a plurality of social contents posted by said user and/or a hashtag so that said user and said hashtag is related to a set of messages; and
   performing a spammer filtering and text preprocessing approach before modeling said user interest topic.

4. The method of claim 1 further comprising generating said social graph utilizing said user as a node and a social relationship between said users as an edge wherein said edge weight is defined based on a strength of relationship.

5. The method of claim 1 wherein said influence measuring process comprises a static diffusion model.

6. The method of claim 5 wherein said static diffusion model comprises at least one of the following types of model:
   a betweenness centrality analysis; and
   a K-Shell decomposition process.

7. The method of claim 6 wherein said betweenness centrality analysis further comprises:
   measuring centrality of a node within a graph by said betweenness centrality analysis in order to emphasize strength of a weak tie between at least two clustered communities having an impact on coverage of a marketing message diffusion process.

8. The method of claim 1 wherein said K-Shell decomposition process further comprises considering an individual in a highest K-shell as said influential user.

9. The method of claim 1 wherein said influence measuring process comprises a dynamic diffusion model.

10. The method of claim 9 wherein said dynamic diffusion model comprises at least one of the following types of model:

a diffusion graph construction process; and
a continuous-time Markov process.

11. The method of claim 10 wherein said diffusion graph construction process further comprises:
generating a propagation sequence based on a hashtag and a uniform resource locator and sequencing a group of users based on a time of post for a given hashtag and uniform resource locator;
categorizing said propagation sequence into a plurality of topics utilizing said topic modeling approach wherein said propagation sequence in each topic constructs a topic-dependent diffusion graph that naturally considers a topic-dependent user interest.

12. The method of claim 10 wherein said continuous-time Markov process further comprises:
denoting a transition probability from one state to another state over a time period and extracting a message propagation state utilizing said time stamp information;
computing a user rank by calculating a transition rate matrix based on an extracted state in order to thereafter generate a transition matrix and a steady state distribution of said transition matrix;
estimating a mean first passage matrix and a mean first passage time matrix in order to calculate said user rank; and
performing a propagation estimation by estimating a transition probability matrix to identify said key influencer.

13. The method of claim 1 further comprising accelerating influence measuring process utilizing said data intensive distributed application module to calculate said key influencer within said specific time window.

14. A system for identifying a key influencer in a social media, said system comprising:
a processor; and
a computer-usable medium embodying computer code, said computer-usable medium being coupled to said data bus, said computer program code comprising instructions executable by said processor and configured for:
compiling a user interest profile by analyzing a historical message stored in a database utilizing a topic modeling approach to thereafter generate social graph data;
performing an influence measuring process based on said social graph data utilizing an influence measuring module and a data intensive distributed application module to identify a set of key influencers in a particular topic area by considering time stamp information; and
assessing an impact of user communication with respect to growth of a conversation within a predefined time interval in order to predict a message propagation speed and coverage in a social network and permit efficient targeting of said message to said key influencer of a targeted community.

15. The system of claim 14 wherein said topic modeling approach comprises a Latent Dirichlet Allocation modeling process.

16. The system of claim 14 wherein said instructions are further configured for generating said social graph utilizing said user as a node and a social relationship between said users as an edge wherein said edge weight is defined based on a strength of relationship.

17. The system of claim 14 wherein said influence measuring process comprises a static diffusion model.

18. The system of claim 14 wherein said influence measuring process comprises a dynamic diffusion model.

19. The system of claim 14 wherein said instructions are further configured for accelerating influence measuring process utilizing said data intensive distributed application module to calculate said key influencer within said specific time window.

20. A processor-readable medium storing code representing instructions to cause a processor to perform a process for identifying a key influencer in a social media, said code comprising of code to:
compile a user interest profile by analyzing a historical message stored in a database utilizing a topic modeling approach to thereafter generate social graph data;
perform an influence measuring process based on said social graph data utilizing an influence measuring module and a data intensive distributed application module to identify a set of key influencers in a particular topic area by considering time stamp information; and
assess an impact of user communication with respect to growth of a conversation within a predefined time interval in order to predict a message propagation speed and coverage in a social network and permit efficient targeting of said message to said key influencer of a targeted community.

* * * * *